Dec. 1, 1942.  A. G. SCOTT  2,303,506
SWITCHING SYSTEM
Filed July 20, 1940
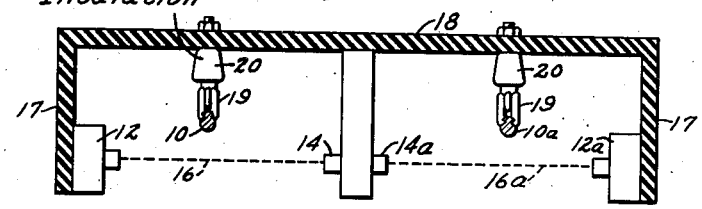
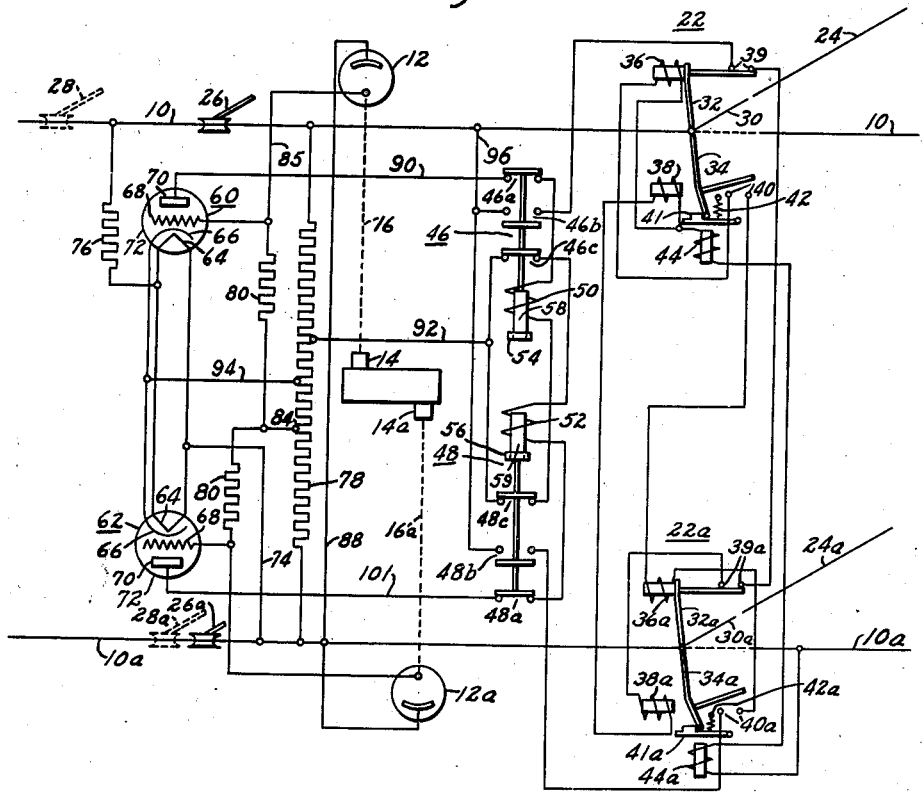
WITNESSES:
INVENTOR
Angus G. Scott.
ATTORNEY Patented Dec. 1, 1942

2,303,506

UNITED STATES PATENT OFFICE 2,303,506

SWITCHING SYSTEM

Angus G. Scott, Mount Lebanon, Pa., assignor to Westinghouse Electric & Manufacturing Company, East Pittsburgh, Pa., a corporation of Pennsylvania Application July 20, 1940, Serial No. 346,603

6 Claims. (Cl. 191—38)

My invention relates, generally, to control systems, and it has reference in particular to automatic switching systems for a plurality of conductors in a trolley conductor system and other systems of the same general character where it is desired to control the operation of movable switch tongues.

Generally stated, it is an object of my invention to provide a simple and efficient control system for operating a pair of trolley frogs at an intersection in a trolley conductor system in accordance with the relative longitudinal positions of the current collectors of an electrically operated vehicle as it approaches the intersection.

More specifically, it is an object of my invention to provide for controlling the movable tongues of a pair of trolley frogs at an intersection of main and branch conductors in a trolley conductor system by means of light sensitive or responsive control devices which are responsive to the passage of the current collectors of an electrically operated vehicle to effect a pre-positioning of the tongues in accordance with the relative longitudinal positions of the current collectors as they approach the intersection.

A further object of my invention is to provide for controlling the operation of a pair of electrically operated trolley frogs positioned at an intersection in a trolley conductor system, for guiding the current collectors of an electrically operated vehicle by a pair of electrically interlocked control relays operable under the control of light sensitive or responsive devices responsive to the passage of the current collectors.

Yet another object of my invention is to provide a switching system for a pair of main and branch conductors wherein a plurality of light sensitive devices are utilized to selectively control the circuit connections in accordance with the relative longitudinal positions of the current collectors of an electrically operated vehicle as they pass the light sensitive devices.

In accordance with one embodiment of my invention, instead of utilizing a number of contactor devices positioned adjacent the main and branch conductors of the trolley conductor system for mechanical engagement with the passing current collectors of an electrically operated vehicle, as heretofore, for controlling the operation of the movable tongues of a pair of electrically-operated trolley frogs at the intersections of the main and branch conductors, a simple and efficient switching system may be provided by utilizing light sensitive control devices mounted in such position as to be responsive to the passage of the current collectors thereby. Control relays for energizing the actuating means of the movable tongues in opposite directions may be controlled by the light sensitive devices through suitable control circuits in response to the passage of the current collectors. By positioning the light sensitive device adjacent the main conductor on the side of the branch conductors slightly in advance of, or further from, the trolley frog, and preventing either of the control relays from effecting the energization of the movable tongue actuating means for a predetermined time after the other of the control relays operates, positive and accurate control of the movable tongues may be had to pre-position them in accordance with the relative longitudinal positions of the current collectors as they approach the intersection.

For a more complete understanding of the nature and the scope of my invention, reference may be had to the following detailed description, and the accompanying drawing, in which:

Figure 1 is a side elevational view partly in section illustrating one method of positioning the light sensitive devices and light sources, and Fig. 2 is a diagrammatic view of a switching system embodying the principal features of the invention.

Referring to Fig. 1 of the drawing, the reference numerals 10 and 10a may denote generally the positive and negative trolley conductors of an overhead conductor system for trolley bus operation. For the purpose of controlling the operation of a pair of electrically operated trolley frogs (not shown in this figure) at an adjacent intersection of the main conductors 10 and 10a with a pair of branch conductors (not shown), light sensitive or responsive devices 12 and 12a of any suitable type well known in the art, and an associated light source, or a pair of light sources 14 and 14a, may be positioned adjacent the main conductors in a suitable manner, so that the light beams 16 and 16a, represented by the dotted lines, may be interrupted by the passage of the current collectors of an electrically-operated vehicle, to effect the operation of the trolley frogs in accordance with the relative longitudinal positions of the current collectors as they approach the intersection.

The light sensitive devices may, for example, be of the selenium cell type, the resistance of which varies with variations in the intensity of the light to which it is subjected. They may be positioned slightly below and to one side of the conductors 10 and 10a, respectively, being, for example, secured to the depending end portions 17 of a support member 18. The support member 18 may be positioned in any suitable manner, such as by means of trolley ears 19, which may be clamped to the trolley conductors, and insulators 20 interposed between the trolley ears and the support member. The light sources may be secured to the support member between the trolley conductors to direct the light beams 16 and 16a on the light sensitive devices 12 and 12a substantially transverse to and slightly below the main conductors 10 and 10a, where they may be interrupted by the passage of the current collectors along the main conductors.

Referring to Fig. 2, the reference numerals 22 and 22a may denote, generally, a pair of electrically operated trolley frogs to be operated under the control of the light sensitive devices 12 and 12a so as to provide a selective switching connection between the main conductors 10 and 10a, and an associated pair of branch conductors 24 and 24a, respectively. The reference numerals 26 and 26a denote the current collectors of an electrically operated vehicle approaching the intersection to proceed therethrough along the main conductors. The current collectors 28 and 28a, shown in dotted lines, represent the current collectors of a vehicle which is about to make a turn from the main to the branch conductors. It is to be understood that while I have shown only a left-hand intersection, this is for purposes of illustration only, and my invention is not limited to the particular type of intersection shown, but may be readily adapted for other types of intersections, without altering the invention.

The trolley frogs 22 and 22a may be of any type well known in the art, having pivotally mounted movable tongues 30 and 30a for guiding the current collectors with armatures 32, 32a and 34, 34a connected therewith for positioning the tongues in alignment with either the main or the branch conductors. Suitable means may be provided for actuating the armatures, such as, for example, the solenoids 36, 36a and 38, 38a, respectively. The armatures may be provided with auxiliary contact members 39, 39a and 40, 40a, for controlling the energizing circuits of the solenoids. In order to maintain the movable tongues 30 and 30a in either of the positions to which they are actuated, suitable latching means may be provided, such as the latches 41 and 41a. The latches may be provided with springs 42 and 42a for normally urging them to the latching positions, and latch solenoids 44 and 44a for releasing them to permit movement of the tongues from one position to another.

With a view to selectively controlling the energization of the operating and latch solenoids to actuate the movable tongues to different positions, the control relays 46 and 48 may be utilized, having operating windings 50 and 52. To insure the proper energization of the operating solenoids of the trolley frogs, the control relays 46 and 48 may be provided with auxiliary contact members 46a and 48a for interrupting the energizing circuits of their respective operating windings 50 and 52, auxiliary contact members 46c and 48c for also interrupting the energizing circuits of the operating windings 52 and 50, respectively, and time delay means in the form of short circuited damper windings 54 and 56, which may be positioned on the armatures 58 and 59, to retard the return of these armatures to the deenergized positions for a predetermined time after deenergization of the operating windings 50 and 52. Contact members 46b and 48b of the relays may be connected to control the energization of the operating windings of the trolley frogs 22 and 22a.

The operation of the control relays 46 and 48 may be controlled by the light sensitive devices 12 and 12a in response to the interruption of the light beams 16 and 16a. In order to prevent faulty operation of the control relays because of slight differences between the relative longitudinal positions of the current collectors as they approach the intersection, the light sensitive device 12 may be positioned slightly ahead of, or further from the intersection, than the light sensitive device 12a. A distance of from three to five inches will be sufficient in most cases. The light beam 16 will then be interrupted before the light beam 16a, when the vehicle is proceeding straight ahead along the main conductors.

For the purpose of effecting the operation of the control relays 46 and 48 in response to the order of the interruption of the light beam by the current collectors of the vehicle, suitable control means, such as the grid controlled valves 60 and 62 may be utilized. They may be of any type well known in the art, having, for example, filaments 64, cathodes 66, control grids 68, and plates 70 contained within a casing 72. The valves 60 and 62 may be connected to control the energization of the operating windings 50 and 52 of the control relays 46 and 48, respectively.

In order to control the conductivity of the control valves 60 and 62 in response to the interruptions of the light beams 16 and 16a, the control valves may be so connected that negative bias voltages are normally applied to the control grids 68 sufficient to render the valves non-conductive when the light beams are uninterrupted. For example, the filaments 64 may be connected to a suitable source, such as the trolley conductors 10 and 10a, by means of a conductor 74 and a current limiting resistance 76. A tapped control resistor 78 may be connected between the conductors 10 and 10a to provide a source of control voltages for the cathodes 66, and the light sensitive devices 12 and 12a may be connected in series circuit relation with suitable grid resistors 80 across a portion of the control resistor 78 to provide circulating currents through the light sensitive devices and grid resistors 80 so long as the light beams 16 and 16a are uninterrupted. Negative bias voltages may thus be impressed between the control grids and the cathodes of the control valves 60 and 62 to render them non-conductive.

When an electrically operated vehicle approaches the intersection intending to proceed therethrough along the main conductors 10 and 10a, the current collectors 26 and 26a of the vehicle are substantially in the same relative longitudinal positions, being substantially opposite one another. As the current collectors 26 and 26a proceed along the main conductors 10 and 10a, the current collector 26 passes between the light sensitive device 12 and its associated light source 14 and interrupts the light beam 16 slightly before the current collector 26a interrupts the light beam 16a.

When the light beam 16 impressed on the light sensitive device 12 is interrupted, the resistance of the light sensitive device 12 increases, so that it becomes substantially non-conductive. The circuit through the grid resistor 80 of the control valve 62 from the tap 84 on the control resistor 78, through grid resistor 80, conductor 86, the light sensitive device 12 and conductor 88 to the negative conductor 10a is effectively interrupted, so that the voltage drop across the grid resistor 80 becomes substantially zero. The negative bias on the grid 68 of the control valve 60 is removed, rendering the control valve conductive.

The operating winding 50 of the control relay 46 is thus energized through the circuit extending from the plate 70 of the control valve 60, through conductor 90, contact members 46a, operating winding 50, contact members 48c, conductor 92, control resistor 78, and conductor 94 to the cathode 66 of the control valve 60.

The control relay 46 is thus actuated to the energized position, opening contact members 46a and 46c so as to interrupt the energizing circuits for the operating windings 50 and 52 of the control relays 46 and 48. The closure of contact members 46b completes an energizing circuit for the solenoids 38 and 38a of the trolley frogs 22, and the latch solenoids 44 and 44a from the positive conductor 10 through conductor 96, contact members 46b, auxiliary contact members 39 and 39a, solenoids 38a and 38, latch solenoids 44 and 44a, to the negative conductor 10a. The latches 41 and 41a are released, and the armatures 34 and 34a are actuated to move the movable tongues 30 and 30a into alignment with the main conductors 10 and 10a to direct the current collectors 26 and 26a therealong.

Should the movable tongue members 30 and 30a be positioned for directing the current collectors along the main conductors 10 and 10a when the operator is desirous of turning onto the branch conductors 24 and 24a, the current collectors 28 and 28a shown in dotted lines will no longer be positioned opposite one another, but the current collector 28a will be substantially in advance longitudinally of the current collector 28, if the operator has maneuvered the vehicle for making a left turn in the direction of the branch conductors.

In this instance the current collector 28a interrupts the light beam 16a impressed on the light sensitive device 12a before the current collector 28 passes between the light sensitive device 12 and its associated light source 14. Accordingly, the resistance of the light sensitive device 12a is momentarily increased so that current ceases to flow through the grid resistor 80 associated with the control valve 62, thus sufficiently reducing the negative bias on the control grid 68 of the control valve 62 to render the control valve conductive.

The operating winding 52 of the control relay 48 is thereby energized through the circuit extending from the plate 70 of the control valve 62, through conductor 101, contact members 48a, operating winding 52, contact members 46c, conductor 92, control resistor 78 and conductor 94 to the cathode 66 of the control valve 62. The control relay 48 operates to the energized position, opening contact members 48a and 48c to interrupt the energizing circuits of the operating windings 52 and 50. Contact members 48b close to complete an energizing circuit for the operating solenoids 36 and 36a and the latch solenoids 44 and 44a of the trolley frogs 22 and 22a. The latches 41 and 41a are released and the armatures 32 and 32a are actuated to position the movable tongues 30 and 30a for guiding the current collectors 28 and 28a along the branch conductors 24 and 24a.

Subsequent operation of the control relay 46 by the passage of the current collector 28 between the light sensitive device 12 and its associated light source 14 is effectively prevented, since the auxiliary contact members 48c interrupt the energizing circuit of the winding 50, and the control relay 48 remains in the energized position sufficiently long enough to prevent completion of the energizing circuit of the operating winding 50 even though the control valve 60 may be momentarily rendered conductive when the light beam 16 is interrupted.

In view of the foregoing description of a preferred embodiment of the invention, it will be apparent that I have provided a simple and efficient system for controlling the operation of a pair of electrically operated trolley frogs in a trolley conductor system so as to pre-position the movable tongue members thereof in accordance with the relative longitudinal positions of the current collectors of the electrically operated vehicle as it approaches an intersection. Positive and reliable control of the trolley frogs may thus be effected without utilizing a number of contact members which must be mechanically engaged by the current collectors to provide control circuits for operating the trolley frogs.

While the invention has been disclosed in a form which is suitable for selectively controlling the operation of electrically operated trolley frogs in an overhead trolley system, it is to be understood that the principles of the invention may be readily utilized in other ways and for other purposes where it may be desired to operate the movable tongue of a switch device from one position to another in accordance with the passage of a current collector or other device carried by a vehicle.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. A switching system for a pair of current collectors mounted on a vehicle comprising, a pair of main trolley conductors of opposite polarity and a branch conductor for each main conductor, a trolley frog located at the intersection of each main and branch conductor having a movable tongue for guiding one of the current collectors along the main conductor or onto the branch conductor depending on the position of the tongue, means for actuating the movable tongue to different positions, a light sensitive device positioned adjacent each main conductor in advance of the intersection having an associated source of light for directing a beam of light on the light sensitive device to be interrupted by the passage of a current collector thereby, and control means operable under the control of the light sensitive devices operable under the control of the light sensitive devices to selectively energize one or the other of the actuating means to position the movable tongues in accordance with the relative longitudinal positions of the current collectors as they interrupt the light beams, said control means remaining in the operative position for a predetermined time after the passage of a current collector by one of the light sensitive devices, and means preventing energization of said one actuating means while the other is energized.

2. A control system for a pair of trolley frogs positioned at the intersections of a pair of main and branch conductors and having movable tongues with actuating means for positioning the tongues to guide the current collectors of an electrically operated vehicle either along the main conductors or onto the branch conductors comprising, a plurality of relays for selectively controlling the energization of the actuating means to move the tongues to different positions, circuit means preventing the operation of the other of the relays when one of said relays operates, a plurality of light sensitive devices having means for producing light beams to render the devices normally conductive so positioned adjacent the main conductors in advance of the intersection that the light beams are interrupted by the passage of the current collectors to vary the conductivity of the light sensitive devices, and control means responsive to the change in conductivity of the light sensitive devices connected to selectively effect the operation of the relay means in accordance with the order of interruption of the light beams to effect movement of the tongues in accordance with the relative longitudinal position of the current collectors as they approach the intersection.

3. A switching system for a pair of current collectors mounted on a trackless vehicle comprising, a pair of main conductors of opposite polarity and a branch conductor for each main conductor, a trolley frog positioned at the intersection of each main and branch conductor of the same polarity having a movable tongue for guiding one of the current collectors either along the main conductor or onto the branch conductor with actuating means energizable to operate the tongue to different positions, a device responsive to radiant energy positioned adjacent each main conductor in advance of the intersection having associated therewith means for producing radiant energy so positioned that the supply of radiant energy to each device is interrupted by the passage of a current collector in the order that the respective current collectors pass the devices for varying the operating conditions of the radiant energy responsive devices, and control means selectively responsive to the order of variations in the operating conditions of the radiant energy responsive devices for controlling the energization of the actuating means to move the tongues to different predetermined positions in accordance with the relative longitudinal positions of the current collectors when the supply of radiant energy is interrupted and means effective to prevent subsequent energization of the actuating means by the control means for a predetermined time after an operation of the control means.

4. A switching system for an intersection of pairs of main and branch conductors of opposite polarity for supplying electrical energy to a pair of current collectors comprising, a switch device for each intersection of a main and branch conductor of the same polarity having a movable tongue with actuating means operable to move the tongue to different positions to guide one of the current collectors either along the main or onto the branch conductor, control means operable to effect the operation of the actuating means to move the tongue to one position or the other, means to prevent the operation of the actuating means to move the tongue to another position for a predetermined time after it operates to move the tongue to one position, control means including longitudinally displaced light sensitive devices for controlling the operation of the control means in accordance with the relative longitudinal positions of the current collectors positioned adjacent the main conductors in advance of the intersections with the branch conductors, and means for producing beams of light to be interrupted by the passage of the current collectors in a predetermined order depending on the relative longitudinal positions of the current collectors as they interrupt the beams for controlling the light sensitive device in accordance with the relative longitudinal positions of the current collectors.

5. A control system for a pair of trolley frogs located at the intersections of main and branch conductors and having movable tongues with actuating means for positioning the tongues to guide the current collectors of an electrically operated vehicle either along the main conductors or onto the branch conductors comprising, a relay operable to control the actuating means of the tongues to position the tongues for guiding the current collectors along the main conductors, an additional relay operable to control the actuating means to position the tongues for guiding the current collectors onto the branch conductors, means to render the other of the relays inoperative when one operates, a grid controlled valve device for effecting the operation of each relay, and light sensitive control means positioned adjacent each main conductor in advance of the intersection responsive in the order of the passage of the current collectors for controlling the grid voltage of the valves in accordance with the passage of the current collectors to selectively position the tongues in accordance with the relative longitudinal positions of the current collectors as they pass the light sensitive device.

6. A control system for a pair of trolley frogs having actuating means for positioning movable tongues to direct a pair of current collectors either along a pair of main conductors of opposite polarity, or onto a pair of branch conductors comprising, a pair of relays for controlling the energization of the actuating means to position the tongues in different positions to guide the current collectors along the main or onto the branch conductors in accordance with the relative longitudinal positions of the current collectors as they approach the intersection, each having an operating winding energizable to operate the relay and normally closed contact members connected in the energizing circuit of the operating winding of the other relay, said relays being adapted to remain in the operated position for a predetermined time after operation, a grid controlled valve for effecting the operation of each relay, a light sensitive control device positioned adjacent each main conductor in advance of the trolley frogs having means for producing beams of light to be interrupted by the passage of the current collectors in a predetermined order dependent on the longitudinal positions of the current collectors to vary the operating conditions of the light sensitive control devices, the light sensitive control device adjacent the main conductor on the side away from the branch conductors being positioned nearer to its associated trolley frog, and circuit means for applying to the control grids of the grid controlled valves voltages in response to and in the order of the variations in the conditions of the light sensitive control devices.

ANGUS G. SCOTT.